United States Patent

Krepps, Jr. et al.

[15] 3,679,979

[45] July 25, 1972

[54] AM, FM, AND FM STEREO TUNER HAVING SIMPLIFIED AM TO FM SWITCHING MEANS

[72] Inventors: James Edgar Krepps, Jr.; Meredith K. Chamberlain; Robert D. Fisher, all of Bloomington, Ind.

[73] Assignee: Sarkes Tarzian, Inc., Bloomington, Ind.

[22] Filed: June 26, 1969

[21] Appl. No.: 836,754

[52] U.S. Cl. .......................... 325/315, 179/15 BT, 325/363, 325/492, 334/31

[51] Int. Cl. .......................... H04b 1/16

[58] Field of Search .................. 325/315, 316, 317, 492, 455, 325/363, 443, 462, 452, 461, 488, 492; 329/111; 334/30, 31, 86, 47, 60, 35; 179/15 BT; 332/1, 20, 39; 324/118

[56] References Cited

UNITED STATES PATENTS

| | | | |
|---|---|---|---|
| 3,172,040 | 3/1965 | Schultz | 325/316 |
| 3,249,872 | 5/1966 | Krammer | 325/317 |
| 3,311,838 | 3/1967 | Danker | 325/317 X |
| 3,339,025 | 8/1967 | Csicsatka | 325/316 X |
| 3,472,967 | 10/1969 | Wofford et al. | 325/316 X |
| 3,526,838 | 9/1970 | Banick | 329/111 X |

*Primary Examiner*—Robert L. Richardson
*Attorney*—Mason, Kolehmainen, Rathburn & Wyss

[57] ABSTRACT

A tuner can be switched between AM, FM, and stereo modes of reception without any radio or audio-frequency bandswitching, and without any changes being made in the tuning meter connections. Separate AM and FM radio sections have power terminals which are alternately connected to a source of power by a single pole, double throw AM or FM selector switch. The audio outputs of the two radio sections are fed into a mixing amplifier, and the mixing amplifier output is fed to stereo demodulation circuitry. A single tuning meter is connected between the FM section audio output and the AM section automatic gain control.

6 Claims, 6 Drawing Figures

INVENTORS:
JAMES E. KREPPS, JR.
MEREDITH K. CHAMBERLAIN
ROBERT D. FISHER

BY Mason, Kolehmainen, Rathburn & Wyss
ATTORNEY

INVENTORS:
JAMES E. KREPPS, JR.
MEREDITH K. CHAMBERLAIN
ROBERT D. FISHER

BY Mason, Kolehmainen, Rathburn & Wyss
ATTORNEYS

INVENTORS:
JAMES E. KREPPS, JR.
MEREDITH K. CHAMBERLAIN
ROBERT D. FISHER
BY Mason, Kolehmainen, Rathburn & Wyss
ATTORNEYS

INVENTORS:
JAMES E. KREPPS, JR.
MEREDITH K. CHAMBERLAIN
ROBERT D. FISHER

BY Mason, Kolehmainen, Rathburn & Wyss
ATTORNEYS

AM, FM, AND FM STEREO TUNER HAVING SIMPLIFIED AM TO FM SWITCHING MEANS

The present invention relates to tuners, and more particularly, to tuners of the combined AM–FM, FM stereo type.

A major problem in the design of a tuner is that of designing a single receiver which can properly intercept and process several different types of signals. In order to receive all commercial stations, a tuner must not only be capable of capturing signals in both the high frequency FM band and in the much lower frequency AM band, but it must be capable of both amplitude and frequency demodulation. A stereo FM receiver must also include a stereo subcarrier demodulator, and preferably should include means for disabling the subcarrier demodulator whenever stereo signals are not present. If the receiver includes a tuning meter, the tuning meter is preferably arranged to display signal strength when monitoring AM tuning and frequency error when monitoring FM tuning. The incorporation of all the above elements into a single tuner has in the past necessitated the use of a complicated switching system including a multiple rotary switch whose purpose is to adapt the tuner to the requirements of the particular signals being received. The complexity of these prior art switching systems is most fully appreciated when one observes the massive tangle of wires which connects this rotary switch to all portions of the tuner. Not only are these systems cumbersome and expensive to install, but they create long signal paths which can give rise to regeneration, feedback, and cross-talk, and which are quite vulnerable to switch contact noise problems.

Another problem is that of providing good AM reception at a low cost. Greatly increased AM signal strengths and reduced relative noise levels result when the FM antenna lead-in wire is used as an AM antenna, but such an arrangement can easily overload a tuner located close to a powerful AM transmitter. Distortion resulting from this overloading is readily detected when the tuner output is fed into a high fidelity sound amplification system and is quite objectionable.

Accordingly, a primary object of the present invention is the production of an AM, FM, and FM stereo tuner which includes simplified switching circuitry through which no radio frequency or audio frequency signals pass.

Another object of the present invention is to provide in a tuner of the above type means for attenuating incoming AM signals right at the antenna so as to simplify the gain control circuitry and prevent front end overloading.

An additional object of the present invention is to provide a tuning meter which indicates the amplitude of AM signals and the frequency of FM signals, which includes a stereo indicator lamp, and which operates without the assistance of switching circuitry.

Another object of the present invention is to provide an FM stereo subcarrier demodulation circuit which can pass both AM and FM monaural signals without distortion when a stereo signal is not present, and which produces audio output signals that are exceptionally free from 19 and 38 kc spurious signals.

Briefly, in accordance with these and other objects, an embodiment of the present invention includes an FM radio section, an AM radio section, a multiplex circuit having FM and AM audio inputs and having left and right channel audio outputs, a power supply, and a tuning meter that includes a stereo indicator light. Switching between AM reception and FM reception is accomplished with the assistance of a single pole, double throw switch. This switch has its wiper arm connected to the power supply B+ output terminal and its two poles connected respectively to the B+ terminals of the Fm radio section and of the AM radio section. Hence, switching between AM and FM modes of reception is accomplished merely be re-routing the B+, and no radio frequency band switching is required. The audio signals from both the AM and the FM radio sections are electronically mixed together within the multiplex circuit so no audio switching is required. The FM and the AM radio sections have entirely separate automatic gain control circuits, and therefore no automatic gain control switching is required. Additional single pole switches can be provided for disabling the multiplex circuitry, the automatic frequency control circuitry, and the muting circuitry, if any is included within the tuner. Hence, all the usual features of a high priced, high-fidelity tuner can be provided in a low cost tuner which uses a minimal number of single pole switches for switching and which does not include any radio or audio frequency switching.

The tuning meter is connected directly between the frequency indicating voltage, which appears at the output of the FM radio section and a voltage proportional to signal strength which appears at the output of the AM radio section. When B+ is supplied to the FM radio section, the tuning meter responds to the frequency indicating voltage, and thus indicates the tuning error directly on a zero center scale. When B+ is supplied to the AM radio section, the tuning meter responds to the signal strength proportional voltage and thus can be used to optimize the AM tuning. No changes need be made in the tuning meter connections when the tuner is switched between AM and FM modes of reception. The tuning meter is equipped when two incandescent lamps, one mounted directly above the meter face, and the other mounted directly below the meter face. The first of these lamps is a red stereo indicator lamp. This first lamp is illuminated by the multiplex circuitry whenever a 19 kHz pilot signal is present within the audio signal. The second lamp is a white pilot lamp which normally illuminates the face of the tuning meter. This white pilot lamp also functions as a voltage sensitive resistive element in the voltage regulator portion of the power supply. When the red stereo indicator lamp is illuminated, the additional drain placed upon the power supply by this lamp causes the power supply to dim the white pilot lamp. This causes the meter illumination to change automatically from white to red whenever a stereo signal is tuned in.

The multiplex circuitry is designed to handle audio signals from both the AM and the FM radio sections, and is designed so that the stereo subcarrier detection circuitry is totally disabled unless a 19 KHz pilot signal is present within the audio. Hence, the multiplex circuitry switches on and off automatically, without the assistance of switching circuitry. Novel balanced filters at the multiplex circuit outputs suppress 38 kHz components far more than is possible with conventional bridged filters, and thus provide unusually clean audio signals which may generally be tape recorded without further filtering.

A single twin-lead antenna serves both the AM and the FM radio sections of the tuner. The twin-lead connects to a conventional FM antenna input transformer, and a center tap on this transformer allows the twin-lead itself to be used as an AM antenna. This arrangement provides AM reception which is far superior to that provided by conventional ferrite-rod or inductive loop antennas but produces signal levels which can easily overload the front end of the AM radio section when strong signals are tuned in. Two field effect transistors are therefore used in a novel gain control circuit. The first functions as a grounded source, variable gain radio frequency amplifier. The second functions as a variable attenuator connected between the antenna and the input to the AM radio section. The second transistor, by attenuating the AM signal before it even reaches the AM section, is able to attenuate extremely strong signals to a level sufficiently low that the AM radio section is not overloaded.

Further objects and advantages of the present invention will become apparent in the following detailed description, and the features of novelty which characterize the present invention will be pointed out with particularity in the claims annexed to and forming a part of this specification.

For a further detailed understanding of the present invention, reference may be had to the figures, wherein.

Figure 1:
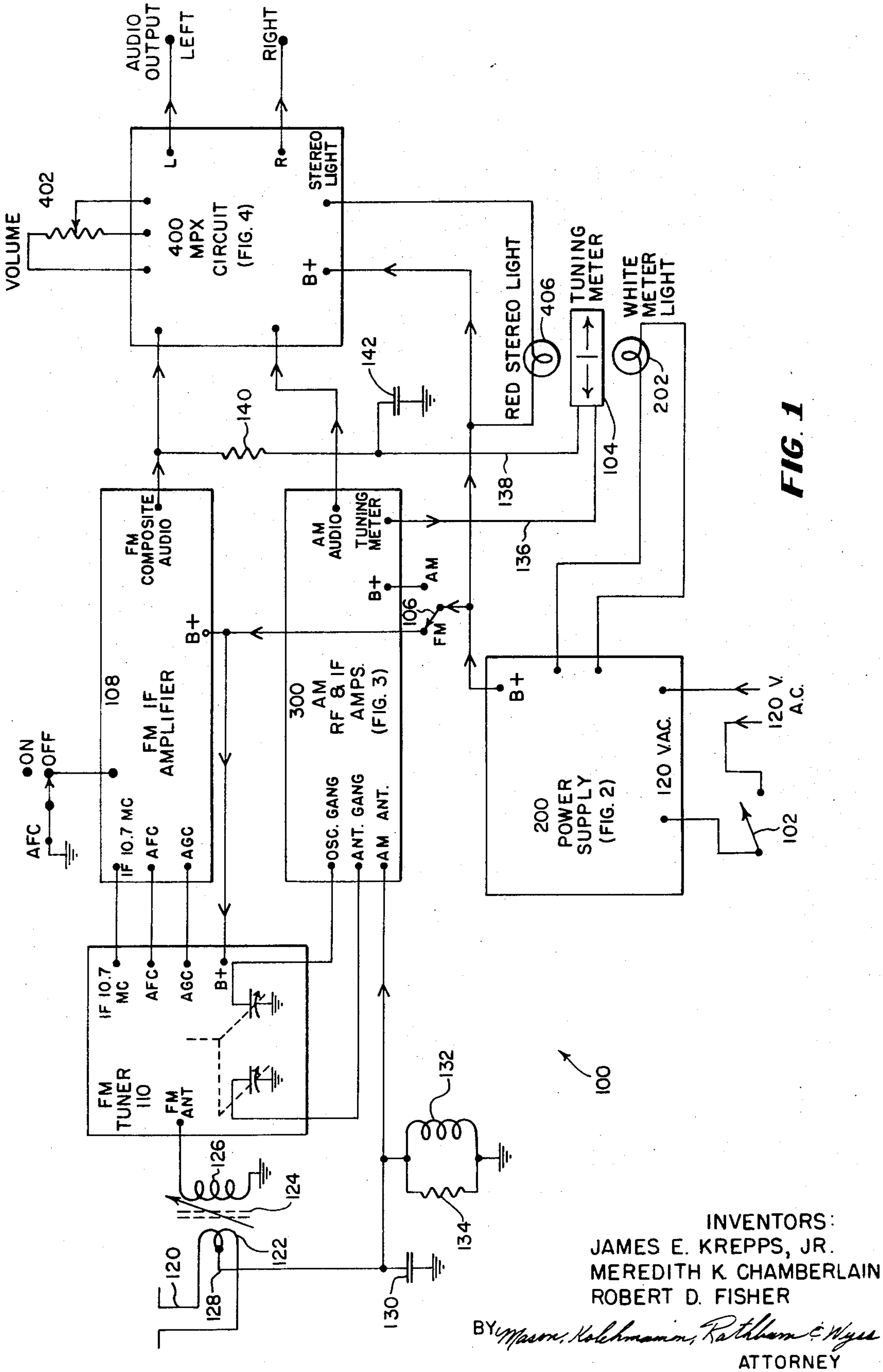
FIG. 1 is a partly schematic, partly diagrammatic representation of an AM, FM, and FM stereo tuner embodying the features of the present invention.

Referring now to the drawings, FIG. 1 shows a tuner designed in accordance with the teachings of the present invention and indicated generally by the reference numeral 100. The tuner 100 includes a power supply 200 which is connected to a source of 120 volt AC current by a switch 102. The power supply 200 generates a constant output potential which is applied between a ground terminal (not shown) and a terminal labeled B+. In addition, the power supply 200 supplies energy to a white pilot lamp 202 which is mounted adjacent a tuning meter 104. Depending upon the state of a single pole, double throw AM–FM switch 106, current from the B+ terminal of the power supply 200 is routed either to the B+ terminal of an FM radio section which includes an FM tuner 110 and an FM IF amplifier 108, or to an AM radio section which includes AM RF and IF amplifiers and an associated oscillator, collectively identified by the reference numeral 300. The switch 106 is thus used to select whether AM or FM broadcast signals are to be received. Current from the B+ terminal of the power supply 200 is continuously supplied to a multiplex circuits 400 which mixes and amplifies both the FM audio signals and the AM audio signals. A volume control 402 is connected within the multiplex circuitry 400 at a point past where the audio signals from the amplifiers 108 and 300 are mixed. The control 402 can be used to adjust the tuner output volume when either AM or FM stations are tuned in. A red stereo indicator lamp 406 is mounted adjacent the tuning meter 104. This lamp 406 connects the B+ terminal of the power supply 200 to a stereo light terminal of the multiplex circuit 400 and is energized whenever the multiplex circuitry is functioning. As will be explained more fully below, the current drain created by the red stereo indicator lamp 406 forces the power supply 200 to dim the white pilot lamp 202. Hence, the color of the tuning meter 104 changes from white to red when a stereo broadcast signal is being received.

Signals from the air are captured by a conventional antenna structure 120 which might comprise a length of twin-lead antenna conductor connected to a dipole or a folded dipole FM antenna. The antenna structure 120 is coupled to a conventional FM tuner 110 by a tunable transformer 124. The antenna structure 120 connects to a primary winding 122 of the transformer 124, and the tuner 110 connects to a secondary winding 126. AM signals captured by the antenna structure 120 are fed from the center tap 128 of the primary winding 122 to an AM antenna terminal of the AM RF and IF amplifier circuitry 300. A capacitor 130 connects the tap 128 to ground for high frequencies and thus prevents FM signals from entering the AM antenna terminal. A coil 132 provides a low impedance path from the tap 128 to ground for 60 Hz signals which may be present on the antenna structure 120, and a resistor 134 is connected in parallel with the coil 132 to dampen out possible oscillations in the coil 132. In order to simplify the mechanical structure of the tuner 100, the gang tuning capacitors for the AM antenna and the AM oscillator tuned circuits of the AM tuner and IF amplifier section 300 are mounted on the same shaft with the gang capacitors (not shown) for the FM tuner section 110, as is indicated schematically in FIG. 1.

The tuning meter 104 is a zero center current meter which is connected between two input leads 136 and 138. The lead 136 connects to the tuning meter terminal of the AM RF and IF amplifiers 300. The lead 138 is connected by a resistor 140 to the FM composite audio terminal of the FM IF amplifier 108. A capacitor 142 connects the lead 138 to ground. The capacitor 142 and resistor 140 together form a low pass filter 140–142 which prevents audio from reaching the tuning meter 104.

During FM reception, the AM RF and IF amplifiers 300 do not receive any operating potential from the power supply 200 because the switch 106 is in the FM position. The AM RF and IF amplifiers 300 are thus passive, and the tuning meter terminal of the amplifiers 300 applies only a ground level bias potential to the tuning meter lead 136. The FM IF amplifier 108 is active, and the amplifier 108 applies an FM composite audio signal to the low pass filter 140–142 and to the tuning meter lead 138. Assuming that the FM composite audio signal is generated by a conventional FM ratio detector or its equivalent, the FM composite audio signal contains a DC signal component which is proportional both in magnitude and in sign to the tuning frequency error. This DC signal component passes through the low pass filter 140–142 and is applied to the tuning meter lead 138. Since the lead 136 simultaneously receives a ground level bias potential, the tuning meter 104 registers both the magnitude and the sign of the tuning frequency error. When the FM tuner 110 is detuned down in frequency, the tuning meter 104 deflects in one direction; when the FM tuner 110 is detuned up in frequency, the timing meter 104 deflects in the other direction; and when the FM tuner 110 is properly tuned, the tuning meter 104 is undeflected from zero center. The tuning meter 104 thus serves as a convenient indication of tuning error during FM reception.

During AM reception, the FM IF amplifier 108 does not receive any operating potential from the power supply 200 because the switch 106 is in the AM position. The FM RF and IF amplifiers are thus passive, and no FM composite audio signal is present. A ground level bias potential is therefore applied to the tuning meter lead 138 through the low pass filter 140–142. The AM RF and IF amplifiers 300 are active, and the tuning meter terminal of the amplifier 300 applies two signals to the tuning meter lead 136. The first signal is a zero shifting bias signal which deflects the indicator (not shown) within the tuning meter 104 away from zero center and thus relocates the tuning meter "zero" to one end of the tuning meter scale, preferably the left-hand end of the scale. The second signal is proportional to the AM AGC (automatic gain control) signal, which is the DC component of the AM detector audio output signal. This AGC signal increases in magnitude as the AM radio section is tuned towards a station and reaches a maximum level when optimum tuning is achieved. The pointer within the tuning meter 104 thus deflects to the right from its new "zero" as the AM radio section is tuned towards an AM station and is maximally deflected when the AM tuning is optimized. Tuning meters connected in this manner are said to be measuring signal strength, since distance through which the pointer is deflected is roughly proportional to the signal strength in decibels.

Figure 2:
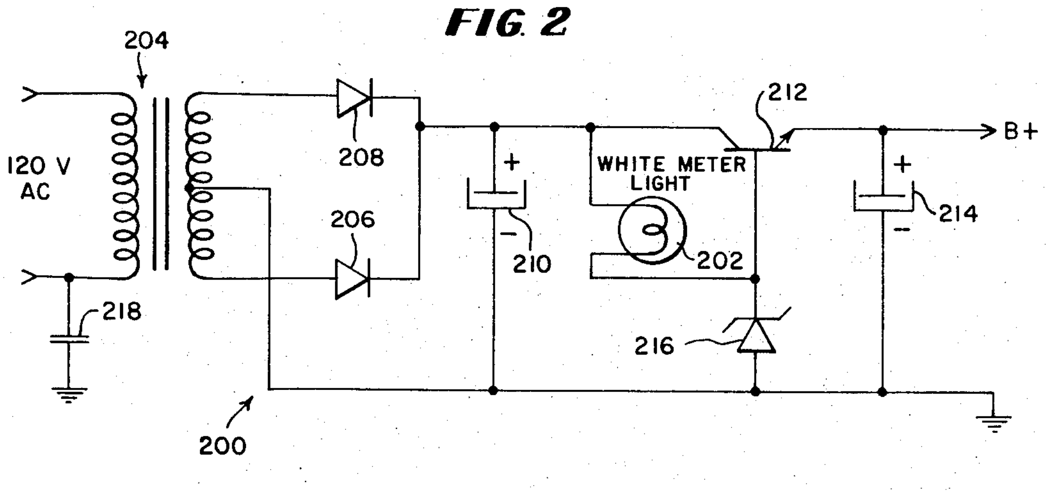
FIG. 2 is a power supply suitable for use in the tuner shown in FIG. 1, and which includes a white pilot lamp that functions as a voltage sensitive variable resistance element in the regulator portion of the power supply, in accordance with one aspect of the present invention.

FIG. 2 is a schematic diagram of the power supply 200. A 120 volt AC input is first converted into an unregulated DC potential by a conventional full wave AC to DC power conversion circuit and is then reduced to a regulated, low ripple B+ potential by an electronic voltage regulator circuit. The full wave AC to DC power conversion circuit includes a power transformer 204, two rectifying diodes 206 and 208, and a filter capacitor 210. This power conversion circuit is conventional and will therefore not be described in detail. The 120 volt AC input is applied to the primary winding of the transformer 204, and the unregulated DC potential appears across the filter capacitor 210. The negative terminal of the capacitor 210 is connected to the tuner 100 chassis which is defined to be at ground potential.

The regulating element within the electronic ripple filter and voltage regular circuit is a power transistor 212. The emitter of the transistor 212 is the B+ output terminal of the supply 200, and the collector of the transistor 212 is connected to the positive terminal of the capacitor 210. A zener diode 216 connects the base of the transistor 212 to ground. Sustaining current for the Zener diode 216 flows through the white pilot lamp 202. This lamp 202 is connected between the positive terminal of the capacitor 210 and the base of the transistor 212.

If the lamp 202 were replaced by a resistor of equivalent ohmic value, this circuit would be a conventional Zener diode-emitter follower voltage regulator. Use of the pilot lamp 202 in place of a resistor greatly improves the regulating ability of the supply 200 by providing a relatively constant sustaining current to the Zener diode. As the voltage across the lamp 202 increases, for example, the lamp 202 heats up. This heating causes the lamp resistance to increase, and this increase in resistance minimizes the change in lamp current produced by the voltage change. As the voltage across the lamp 202 decreases, the lamp 202 cools down. This cooling causes the lamp resistance to decrease, and this decrease in resistance minimizes the change in current produced by the decrease in voltage. By supplying a relatively constant current to the Zener diode 216, the lamp 202 greatly stabilizes the potential which appears across the Zener diode 216, and this in turn stabilizes the B+ potential of the supply 200. Use of the lamp 202 also makes it possible to use a Zener diode 216 having a much higher effective output impedance than would otherwise be the case, and allows use of a power transistor 212 having a beta as low as 25. Since Zener diodes having high output impedances and power transistors having low betas are relatively inexpensive, use of the pilot lamp 202 in place of a resistor substantially reduces the cost of the supply 200.

An important feature of the supply 200 is its ability to automatically dim the pilot lamp 202 when a stereo multiplex signal is received. As was noted above, the red stereo indicator lamp 406 (FIG. 1) greatly increases the current drain on the supply 200 when the lamp 406 is illuminated. This increased current drain produces a substantial decrease in the unregulated DC potential which appears across the filter capacitor 210. This decrease in unregulated potential is caused by increases in the internal voltage drops within the power transformer 204 and also by an acceleration in the rate at which the capacitor 210 is partially discharged. Since the potential across the Zener diode 216 remains substantially constant, and since the Zener diode 216 and pilot lamp 202 are connected serially across the filter capacitor 210, the potential across the pilot lamp 202 is forced down substantially when the stereo indicator lamp 406 is illuminated. This drop in the potential across the pilot lamp 202 dims the pilot lamp 202. It will be remembered that both of the lamps 202 and 406 are used to illuminate the tuning meter 104. Hence, whenever a stereo station is tuned in, the white pilot lamp 202 dims, the red stereo indicator lamp 406 becomes illuminated, and the tuning meter scale changes color from white to red.

The capacitor 218 connects the chassis of the tuner 100 to one side of the power line and thus establishes a path between the chassis and earth. The capacitor 214 is provided to filter the regulated output voltage appearing at the B+ terminal.

Figure 3:
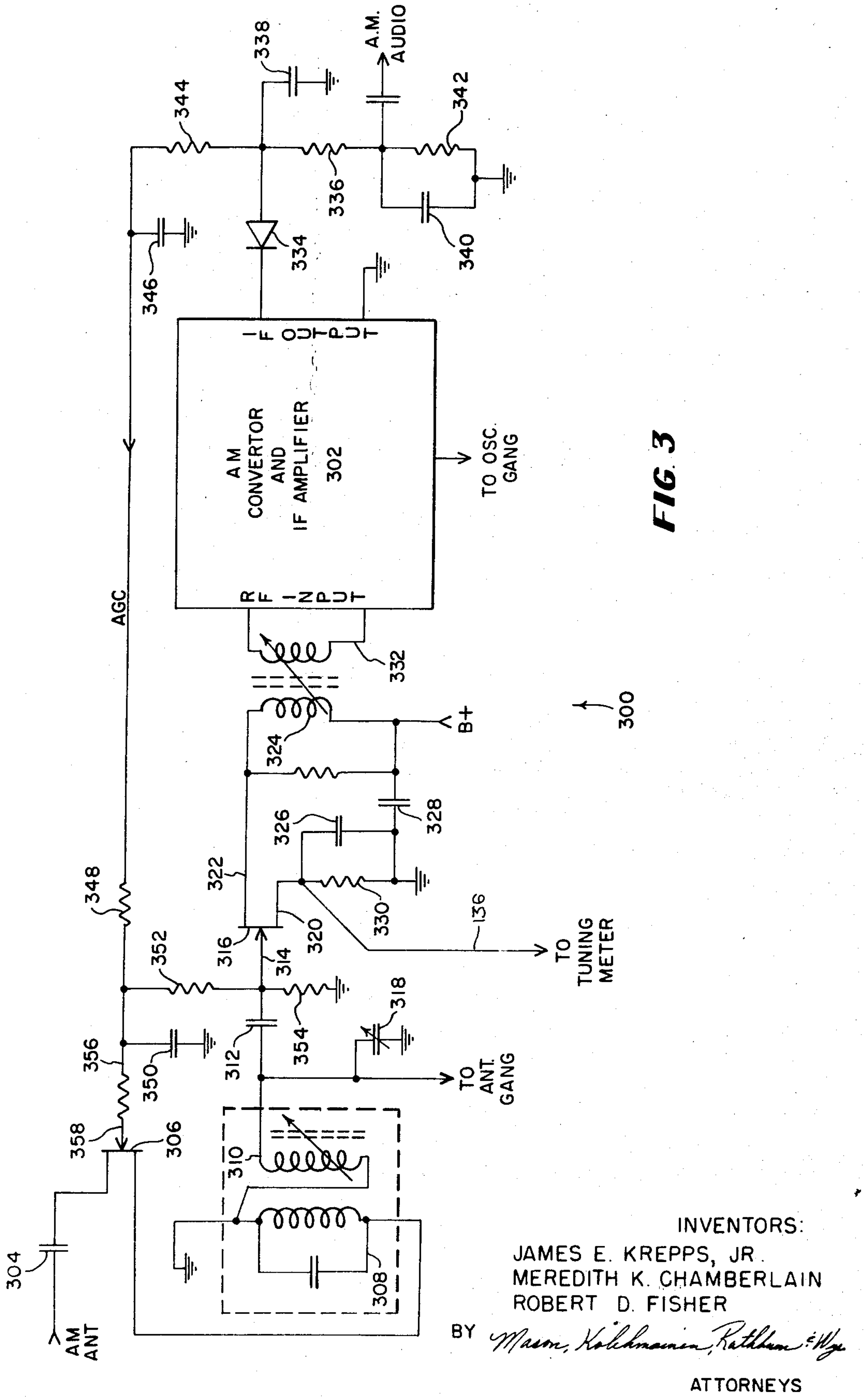
FIG. 3 is a partly schematic, partly diagrammatic representation of the AM radio frequency amplifier, converter, IF amplifier, and detector arrangement of FIG. 1, showing in detail the manner in which two field effect transistors are used for automatic gain control and for generating a properly biased signal for the tuning meter, in accordance with other aspects of the present invention.

Referring now to FIG. 3, the AM RF and IF amplifiers 300 are shown. The AM converter and IF amplifier used in this tuner are conventional in design, and they are shown in block form only and are indicated by the reference numeral 302. The remaining portions of the circuit 300 are shown schematically in FIG. 3. The AM signals come from the center tap 128 of the primary winding 122 shown in FIG. 1. The signals pass through a capacitor 304, a field effect transistor 306, and are applied to a broadly tuned parallel LC circuit 308. An inductively tunable secondary winding 310 is inductively coupled to the inductive arm of the circuit 308, and the signals developed thereacross are coupled through a coupling capacitor 312 to the gate electrode 314 of an N channel field effect transistor 316. The AM antenna gang tuning capacitor (not shown in FIG. 3 but shown schematically in FIG. 1) is connected directly across the secondary winding 310, and a trimmer capacitor 318 is connected in parallel with the gang tuning capacitor. The gang tuning capacitor, the trimmer capacitor 318, and the inductor 310 are tuned and aligned in a conventional manner.

Figure 4:
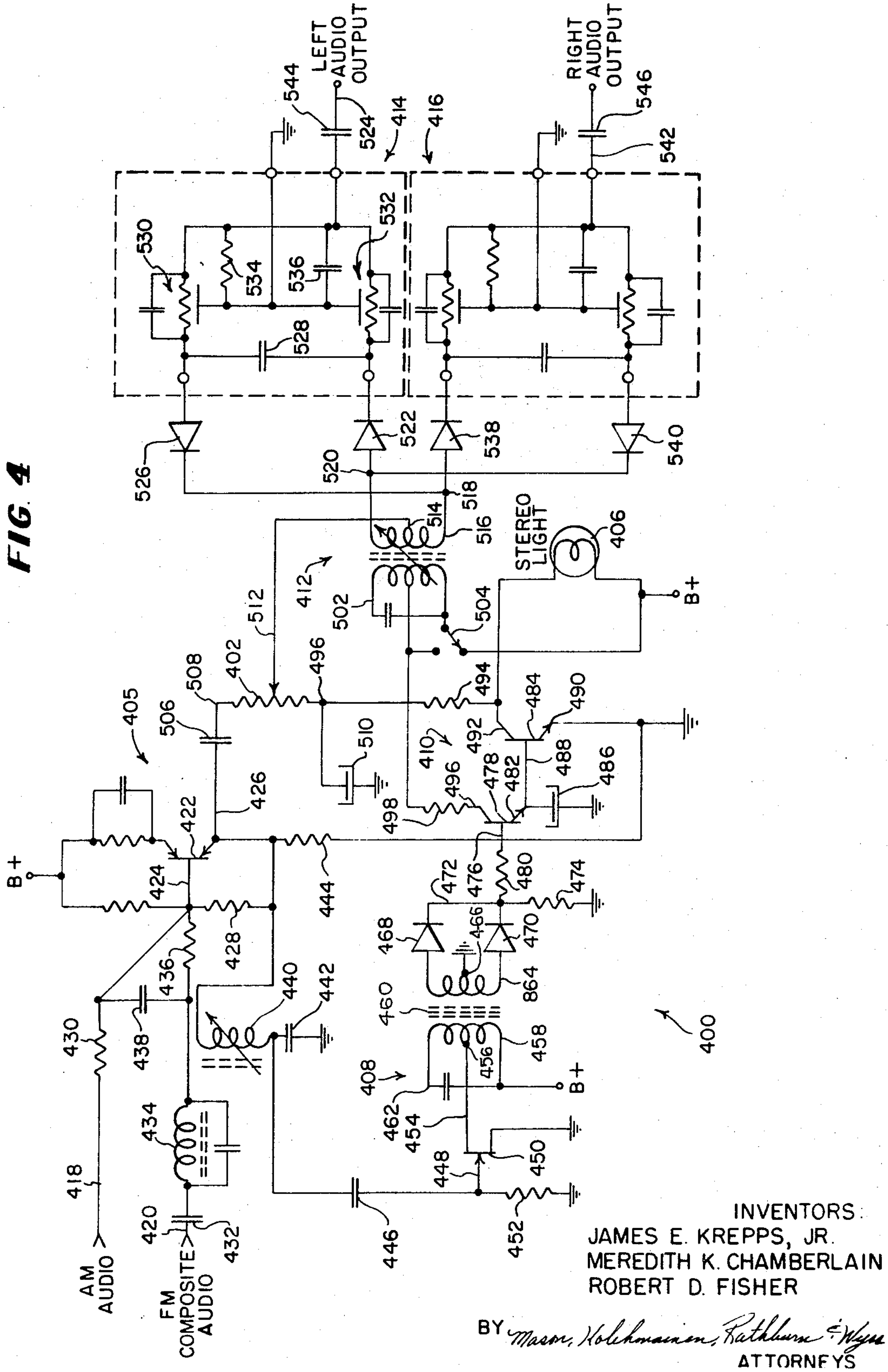
FIG. 4 is a schematic diagram of a multiplex circuit suitable for use in the tuner shown in FIG. 1, and designed in accordance with the present invention.

In accordance with an important aspect of the present invention, the field effect transistor 316 functions as a variable gain radio frequency amplifier for the incoming RF signals, and also functions as a source follower amplifier for the AGC signal. The source potential of this transistor 316 is the zero shifting bias signal which is added to the AM AGC potential and fed to the tuning meter lead 136. RF signals are amplified by the transistor 316 and appear across an inductor 324 which connects the drain 322 of the transistor 316 to the B+ terminal of the AM amplifiers 300. The source terminal 320 of the transistor 316 and the B+ terminal of the amplifiers 300 are both connected to ground by radio frequency bypass capacitors 326 and 328. The capacitor 326 insures that no radio frequency gain is lost through a voltage drop in a resistor 330 which connects the source 320 to ground and which is necessary for proper operation of the tuning meter circuitry, as explained hereinafter. The inductor 324 is inductively coupled to another inductor 332 which feeds the signals into the AM converter and IF amplifier 302. The amplified IF signals then appear across the IF output terminals of the circuit 302 and are peak rectified by a conventional diode rectifier 334. A conventional low pass ripple filter comprising elements 336 through 342 then eliminates radio frequency signal components from the rectified signals, and the resulting audio signals are transmitted to the multiplex unit 400 (FIG. 4).

An automatic gain control signal is derived from the rectified signal at the anode of the diode 334 by a conventional low pass filter comprising resistors 344 and 348, and capacitors 346 and 350. The DC output of this filter appears across the capacitor 350 and is called the AGC (automatic gain control) signal. A high impedance voltage divider comprising serially connected resistors 352 and 354 is connected directly across the capacitor 350 so as to produce a potential at the junction of the two resistors 352 and 354 of the proper magnitude for the application to the gate electrode 314 of the field effect transistor 316.

When a signal is fed through the capacitor 304 and into the system, the signal is amplified, rectified by the diode 334, and appears as a negative DC potential across the capacitor 350. This negative potential is fed back by the resistor 352 to the gate electrode of the field effect transistor 316. This AGC potential biases the field effect transistor 316 negatively and thereby reduces the gain of the field effect transistor 316 so as to stabilize the level of the output signals which appear across the capacitor 338 for all but the strongest signals.

When an exceptionally strong signal is encountered, the negative voltage fed back to the gate electrode 314 is sufficient to pinch off the field effect transistor 316 so that the only coupling between the incoming signals and the AM converter is through the drain-to-gate capacity of the transistor 316. This capacity passes sufficient signal to overload the AM radio section. Thus, additional gain control means are required. The additional gain control means comprises a second field effect transistor 306, which is serially connected between the AM antenna and the tank circuit 308. The second field effect transistor 306 is normally biased so as to be fully conductive and its impedance is therefore negligible when compared with the impedance of the tank circuit 308. However, when the AGC signal becomes sufficiently negative to cut off the transistor 316, this AGC signal is also fed from the capacitor 350 to the gate electrode 358 of the field effect transistor 306 through a resistor 356 begins to cut off the field effect transistor 306. The additional attenuation thus introduced by the transistor 306 reduces the incoming signal level to a sufficiently low magnitude so that even signals of 2 volts in magnitude cannot overload the AM radio section 302.

The field effect transistor 316 also provides a positively biased, amplified version of the AGC signal for presentation to lead 136 of the tuning meter 104. This amplified and positively biased signal appears across the resistor 330 which connects the source electrode 320 of the transistor 316 to ground. The positive bias results because the source electrode of a field effect transistor is normally a volt or more positive with respect to the gate electrode and thus a positive DC potential is presented to the tuning meter 104 even when no AGC signal is present and the gate electrode 314 is closed to ground potential. This positive potential is the zero shift bias signal and functions to drive the needle of the meter 104 to the left-hand edge of the scale. The AGC potential drives the gate electrode 314 negative and decreases the source-drain current so that the voltage across the resistor 330 decreases as the strength of the input signal increases. The needle of the meter 104 moves upscale as the voltage across the resistor 330 thus decreases and when the strength of the incoming signal is sufficiently large to cut off the transistor 316, the meter needle is positioned at the center of the scale of the zero-center meter since the voltage across the resistor 330 is then zero. In this connection, it will be recalled from the foregoing description that during AM reception a ground level bias signal is supplied to the other terminal of the meter 104 from the FM composite audio terminal of the circuit 108. During FM reception, B+ voltage is removed from the transistor 316 so that no voltage is developed across the resistor 330 and the lead 136 is at ground potential.

Referring now to FIG. 4, a schematic diagram of the multiplex circuit 400 is shown. The circuit 400 includes two inputs, an AM audio input 418 for audio signals from the AM circuits 300, and an FM composite audio input 420 for signals from the FM circuits 108. Signals coming from the inputs 418 and 420 are mixed by a mixing amplifier 405 and are fed through the volume control 402 to a multiplex demodulating circuit 412. Left and right audio signals developed in the circuit 412 are respectively passed through balanced subcarrier notch filters 414 and 416. The 19 kHz pilot signal which is a component of the composite FM stereo signal, is extracted from the output of the amplifier 405 by a pilot signal amplifier and double rectifier circuit 408. After rectification, the pilot signal is fed in full wave rectified form into a circuit 410 which includes a 38 kHz amplifier and a stereo-monaural switch. If the 19 kHz pilot signal is of sufficient strength, the circuit 410 supplies a DC potential to the stereo indicator lamp 406 and also through the volume control 402 to the demodulating circuit 412. This DC potential enables the circuit 412 to function as a demodulator. The circuit 410 also supplies a synchronized 38 kHz carrier signal to the circuit 412 so that the circuit 412 can reinsert the carrier into the 38 kHz double sideband portion of the composite audio signal.

A monaural-stereo switch 504 is provided to disconnect the circuit 410 from the multiplex circuit B+ terminal whenever it is desired to provide monaural reception of stereo FM signals. The switch 504 is provided because the signal-to-noise ratio of a weak stereo signal can be improved by as much as 20 db by conditioning the tuner 100 to receive the signal monaurally.

The mixing amplifier 405 comprises basically a high gain grounded emitter transistor amplifier 422 which functions as an inverting operational amplifier. The input 424 to the amplifier 405 is the base of the transistor amplifier 422, and the output 426 is the collector of the transistor amplifier 422. A negative feedback resistor 428 couples the amplifier output 426 to the input 424 and thereby sets the basic gain of the amplifier 405.

The AM audio input 418 is connected directly to the amplifier input 424 through a resistor 430. The gain of the amplifier 405 with respect to AM signals is therefore approximately equal to the ratio of the resistance of the resistor 428 to the resistance of the resistor 430. This ratio may be set to give whatever gain is desired. The FM composite audio signal is fed serially through an audio coupling capacitor 432, a 67 kHz storecast notch filter 434, and the parallel combination of a resistor 436 with a capacitor 438, to the amplifier input 424. The gain of the amplifier 405 for the FM composite audio signal is again approximately equal to the ratio of the resistance of resistor 428 to the total impedance connected between the amplifier input 424 and the FM ratio detector output 420. The DC component of the ratio detector output signal is blocked by the capacitor 432 and does not reach the amplifier 405.

Audio signals within the frequency range of 30 Hz to 19 kHz are essentially unaffected by the capacitor 432 and by the storecast filter 434, but are of too low a frequency to pass readily through the capacitor 438. Hence, these audio signals are amplified by an amount approximately equal to the ratio of the resistance of the resistor 428 to the resistance of the resistor 436. In the preferred embodiment, these resistors are chosen to give an audio gain that is greater than the audio gain for AM signals so as to compensate for the fact that the FM ratio detector puts out a lower amplitude signal than does the AM detector. Inaudible double sideband subcarrier signals within the frequency range between 19 kHz to 57 kHz are amplified to a greater extent by the amplifier 405 because for these frequencies the capacitor 438 effectively reduces the impedance of the resistor 436. Increased subcarrier frequency gain is necessary to insure proper operation of the multiplex demodulation circuit 412. Background music storecast signals which are usually transmitted as a 67 Hz frequency modulated inaudible tone, are prevented from reaching the amplifier 405 by the 67 Hz storecast notch filter 434. It is necessary to trap out these signals so that they are not rendered audible by hetrodyning with the second harmonic of the reinserted 38 kHz carrier. This second harmonic has a frequency of 76 kHz. Without the filter 434, a 9 kHz frequency modulated tone sometimes appears in the audio output.

A 19 kHz series tuned circuit is provided comprising an inductor 440 and a capacitor 442 and connects the output 426 of the amplifier 405 to ground. This series tuned circuit 440–442 serves three functions. First, this tuned circuit effectively short circuits the collector load resistor 444 of the transistor amplifier 422 at the frequency of 19 kHz, and thus greatly reduces the amplitude of the 19kHz signal which appears at the output 426. Secondly, by preventing 19kHz from flowing through the negative feedback resistor 428, this tuned circuit increases the current gain of the amplifier 405 for 19kHz signals. Thirdly, this tuned circuit captures almost all 19kHz current components which flow from the amplifier 405. This 19kHz current produces a large amplitude 19kHz potential across the capacitor 442, which potential is fed through a coupling capacitor 446 to the gate electrode 448 of a field effect transistor amplifier 450 within the circuit 408. A resistor 452 supplies ground level bias to the gate 448. The 19kHz potential negatively self biases the capacitor 446 because of current flow into the gate electrode 448 whenever the gate 448 attempts to go positive. This self biasing causes the amplifier 450 to function as a limiter as well as an amplifier.

The drain terminal 454 of the field effect transistor 450 connects to a tap 456 in the primary winding 458 of a transformer 460. This primary winding 458 is tuned to resonance at 19kHz by a capacitor 462 which is connected in parallel with the primary winding 458. One end of the winding 458 is connected to the multiplex circuit B+ terminal so the winding 458 serves as a source of operating current for the transistor amplifier 450. The amplifier 450 induces a large amplitude 19kHz signal in the primary winding 458.

The secondary winding 464 of the transformer 460 is center tapped to ground and is connected in the manner of a two diode full wave rectifier of the type commonly found in power supplies. The center tap 466 of the winding 464 is grounded and serially connected diodes 468 and 470 having a common cathode connection 472 are connected across the winding 464. The node 472 is connected to ground by a resistor 474 and to the base electrode 476 of a transistor 478 within the circuit 410 by a resistor 480. When a 19kHz pilot signal is present, it appears in full wave rectified form at the node 472. The DC component of this rectified signal initiates operation of the multiplex demodulating circuit 412, and the 38 kHz first harmonic component of this rectified signal is the recreated subcarrier that is added to the composite audio before demodulation.

The circuit 410 includes the first transistor 478 which serves as a 38kHz subcarrier amplifier, and a second transistor 484 which serves as an electric switch. The emitter 482 of the transistor 478 is connected to ground by a filter capacitor 486, and is also connected to the base 488 of the switching transistor 484. The emitter 490 of the transistor 484 is grounded. When a stereo pilot signal is present, the DC component of the signal coming from the node 472 flows through the base-emitter junction of the transistor 478 and charges the capacitor 486 to a potential level sufficient to maintain continuous conduction through the base-emitter junction of the transistor 484. This renders the transistor 484 fully conductive. The collector 492 of the transistor 484 is connected to the multiplex circuit B+ terminal through the stereo indicator lamp 406 so that conduction of the transistor 484 causes the lamp 406 to be energized. Hence, whenever a 19 kHz pilot signal is present in the composite audio, the stereo indicator lamp 406 is illuminated. The lamp 406 also is illuminated when an extremely noisy signal is received, since random noise contains sufficient amounts of 19 kHz signal to cause continuous conduction of the transistor 484.

The transistor 478 amplifies the 38 kHz component which comes from the node 472. This amplified signal component appears at the collector 496 as a 38 kHz square wave, and is fed through a resistor 498 to a tap on a 38 kHz resonant tank circuit 502. One end of the resonant tank circuit 502 is normally connected by the switch 504 to the B+ terminal, so that the inductive branch of the tank circuit 502 provides the necessary operating current for the transistor 478. The resistor 498 causes the transistor 478 to function as a limiter, clipping both the tops and the bottoms from the full wave rectified 38 kHz signal which appears at the node 472. The current waveform which appears at the collector 496 is therefore a rectangular waveform of relatively constant amplitude. The voltage which appears at the collector 496 is determined for the most part by the ringing of the 38 kHz tank circuit 502 and is therefore essentially sinusoidal. It can thus be seen that a relatively pure, constant amplitude 38 kHz sinusoidal signal is developed within the tank circuit 502. This sinusoidal signal is the reconstituted 38 kHz carrier which has to be reinserted into the FM composite audio signal before the left and right channel audio signals can be separated from one another. The exact phase different between this carrier signal and the FM composite audio signal is adjusted by readjusting the tuning of any of the tuned circuits within the multiplex circuit 400. Preferably, one of the more broadly tuned circuits is used for this purpose so that the amplitude of the reconstituted carrier is not diminished.

The multiplex demodulating circuit 412 mixes the reconstituted carrier signal with the FM composite audio, and passes the resultant signal to an array of four diodes 522, 526, 538, and 540 which act as envelope peak detectors and which thus are able to extract the left and the right channel audio signals, as represented by the upper and lower envelopes of the resultant signal.

The FM composite audio signal is passed from the output 426 of the amplifier 405, through an audio coupling capacitor 506, to one end 508 of a volume control potentiometer 402. The other end 496 of the volume control potentiometer 402 is effectively grounded for audio signals by a capacitor 510. The composite audio signal is recovered at the movable tap 512 of the potentiometer 402 and is applied to the center tap 514 of a coil 516. Since the coil 516 is inductively coupled to the reconstituted carrier tank circuit 502, the reconstituted carrier is both added to and subtracted from the composite audio signal. The sum of the FM composite audio signal and the reconstituted carrier signal appears at a node 520, and the difference between these two signals appears at a node 518. In accordance with the theory of FM multiplex demodulation, the waveforms at the nodes 518 and 520 are 38 kHz amplitude modulated signals having unsymmetrical upper and lower envelopes which respectively represent the desired left and right channel audio signals.

Assuming that the phasing of the reconstituted carrier is properly adjusted, the waveform at the node 518 has an upper envelope, and the waveform at the node 520 has a lower envelope. Both of these envelopes represent the desired right channel audio signal. Similarly, the waveform at the node 518 has a lower envelope, and the waveform at the node 520 has an upper envelope. Both of these envelopes represent the desired left channel audio signal. The phasing of the envelopes is such that, after all of the envelopes are recovered with the assistance of peak detectors, the two envelopes representing the left channel audio signal can be directly added together, and the two envelopes representing the right channel audio signal can be directly added together, to form the output signals. The phasing of the 38 kHz ripple components within these envelopes is such that most of the ripple is balanced out when the corresponding envelopes are added together in the above manner. The audio components are added in parallel so as to reinforce each other, and the ripple components are added in push-pull or phase opposition so as to cancel. This method of reducing the amount of 38 kHz ripple by balancing the ripple contained in a positive envelope against that contained in a negative envelope constitutes an important part of the present invention.

The particular node 518 or 520 which receives the left audio signal as the upper envelope component is determined by the particular phase adjustment of the multiplex circuit 400, and this can be easily changed, if desired, by readjusting any tuned circuits within the circuit 400. It will be assumed in the following discussion that the adjustment of the tuned circuits within the multiplex circuit 400 is such that the envelopes are as described above.

The upper envelope of the waveform appearing at the node 520 is detected by the diode 522 which is polarized so as to detect positive peaks in the waveform at the node 520. Similarly, the lower envelope of the waveform appearing at the node 518 is detected by a diode 526 which is polarized so as to detect negative peaks in the waveform at the node 518. Both of these envelopes represent the left audio signal, and both of these envelopes are in phase. A network 414 couples the two diodes 522 and 526 to the left channel audio output terminal 524. Since positive peaks at the node 520 occur simultaneously with negative peaks at the node 518, a single peak detector storage capacitor 528 within the network 414 can be used to connect the cathode of the diode 522 to the anode of the diode 526. Bridged T notch filters 530 and 532 within the network 414 couple the cathode of the diode 522 and the anode of the diode 526 to the left channel audio output terminal 524. These notch filters 530 and 532 may each conveniently comprise an integral unit using distributed capacity to the series resistance element as the shunt capacity element of the filter, as will be readily understood by those skilled in the art. Each of the filters 530 and 532 is tuned to 38 kHz so as to suppress the transmission of 38 kHz components to the output terminal 524. Since, as noted above, the 38 kHz components which appear at the cathode of the diode 522 are oppositely phased from those appearing at the anode of the diode 526, these components tend to balance out and to cancel each other at the output terminal 524. This balanced arrangement, coupled with the use of the notch filters 530 and 532, provides a level of 38 kHz carrier suppression that could otherwise be achieved only by multiple filtering. Since 38 kHz carrier components in the audio signal can cause amplifiers and speakers to overheat, and can also hetrodyne with the bias oscillators of tape recorders to produce audible whistles, the circuit arrangement contained within the network 414 is extremely useful. The network 414 is constructed as a single composite unit and contains all of the elements within the dashed line in FIG. 4. De-emphasis for the FM composite audio signal is provided by a parallel RC circuit 534–536 which connects the output terminal 524 to ground and which is also contained within the network 414.

The diodes 538 and 540 function in a manner exactly analogous to the functioning of the diodes 526 and 522, and they extract the envelopes representing the right channel audio signals from the signals appearing at the nodes 518 and 520. The network 416 functions in exactly the same manner as does the filter network 414, and the filtered and de-emphasized right channel audio signal appears at the right channel audio output terminal 542. Audio coupling capacitors 544 and 546 then respectively couple the left and right channel audio signals to output jacks mounted on the rear of the tuner 100 or to suitable amplification means.

Because the 38 kHz double sideband subcarrier in an FM composite audio signal can contain up to 20 db more noise than the main channel audio signal, it is customary in a multiplex circuit to provide means for defeating the subcarrier detection circuitry whenever a monaural signal is to be received. The circuit 400 performs this task automatically. When a monaural signal is being received, the magnitude of the signal appearing at the node 472 is insufficient to cause conduction in either the transistor 478 or in the transistor 484. Hence, no energy is supplied to the tank circuit 502, and thus no subcarrier is reconstituted and injected into the FM composite audio by the winding 516. Since the transistor 484 is turned off, the stereo indicator lamp 406 remains unilluminated. It is also necessary under these conditions to bias the four diodes 522, 526, 538, and 540 so that they do not clip and distort the monaural composite audio signal. This is done by a resistor 494 which feeds the B+ potential signal now present at the collector 492 of the transistor 484 to the capacitively grounded end 496 of the volume control potentiometer 492. This DC potential feeds directly through the wiper arm 512 of the volume control 402 and the winding 516 and biases the diodes 522 and 538 fully conductive while simultaneously biasing the diodes 526 and 540 completely out of conduction. The monaural signals then pass freely through the diodes 522 and 538, and the networks 414 and 416 act simply as de-emphasis networks.

Figure 5:
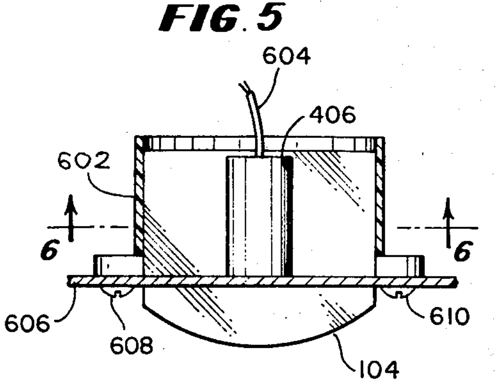
FIG. 5 is a partly sectional plan view of a tuning meter and lamp assembly of a type suitable for use with the tuner shown in FIG. 1.
Figure 6:
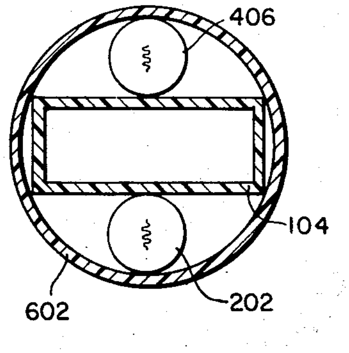
FIG. 6 is an elevational and partly sectional view of the light and meter assembly shown in FIG. 5 and revealing the spatial relationships between the tuning meter and the lamps used to illuminate the tuning meter.

Referring now to FIGS. 5 and 6, an arrangement is shown whereby the tuning meter 104 can be mounted adjacent the red stereo indicator lamp 406 and the white indicator lamp 202. The tuning meter 104 is shown in FIG. 6 to have a rectangular cross section. The meter movement is enclosed in a plastic case so that sources of illumination adjacent the meter 104 can illuminate the meter face. The lamps 202 and 406 are positioned respectively directly below and above the meter 104, as shown in FIG. 6, and the entire assembly including the two lamps 202 and 406 and the meter 104 is enclosed by a cylindrical housing 602 which serves to hold the lamps 202 and 406 tightly in place against the meter 104. FIG. 5 is a plan view of this assembly with the upper portion of the housing 602 cut away to reveal the lamp 406. It can be seen that the lamp 406 is enclosed in a housing of its own and that the leads 604 from the lamp 406 extend outwards from the back of the lamp 406. The meter 104 is shown mounted against a chassis 606 with the aid of two screws 608 and 610. As mentioned above, normally the red stereo indicator lamp 406 is not illuminated, and the white indicator lamp 202 supplies a white light illumination for the scale of the meter 104. When the red stereo indicator lamp 406 is illuminated by the multiplex circuit 400, it gives the scale of the meter 104 a reddish cast. The drain which the red stereo indicator lamp 406 places upon the power supply 200 causes a drop in the potential applied to the white pilot lamp 202 as described heretofore in connection with the power supply 200, and the resulting decrease in white illumination by the lamp 202 accentuates the reddish cast which is given to the scale of the meter 104.

While but a single embodiment of the present invention has been here specifically disclosed, it will be apparent that many variations may be made therein, all within the scope and spirit of the invention.

What is claimed and desired to be secured by Letters Patent of the United States is:

1. An AM and FM tuner comprising:
   an AM radio section having an AM audio output terminal, and also having an AM power terminal;
   an FM radio section having an FM audio output terminal, and also having an FM power terminal;
   a dual-input mixing amplifier having input terminals connected to both said AM and FM audio output terminals and having a single tuner audio output terminal;
   a source of power for said radio sections having a source of power terminal; and
   a switch for connecting said source of power terminal either to said AM power terminal or to said FM power terminal.

2. An AM and FM tuner in accordance with claim 1 wherein the AM radio section includes means for generating an automatic volume control signal, wherein the FM audio output includes a D.C. component that is proportional to the error in FM tuning, and which further includes a tuning meter connected to both the automatic volume control signal and to the FM audio output.

3. An AM and FM tuner in accordance with claim 1 wherein the dual-input mixing amplifier is an amplifier within a stereo multiplex demodulator circuit.

4. An AM and FM tuner comprising:
   an AM radio section including a tuning meter node at which appears a signal proportional to the AM signal strength;
   an FM radio section including an FM audio output node at which appears a signal proportional to the error in FM tuning;
   a tuning meter connected between said tuning meter node and said FM audio output node; and
   means for generating and for feeding to said tuning meter a zero shifting bias signal which biases said meter so as to shift the meter zero from the center of the scale to an edge of the scale when the FM reception is terminated and AM reception is commenced, and which biases the meter sufficiently to shift the meter zero from the edge of the scale back to center scale when AM reception is terminated and FM reception is commenced.

5. An AM and FM tuner in accordance with claim 4 wherein the signal proportional to the AM signal strength appears at the source electrode of a field effect transistor having its gate connected to a source of automatic volume control potential within the AM radio section, whereby the gate to source potential of the field effect transistor is a bias signal which shifts the tuning meter zero.

6. An AM and FM tuner in accordance with claim 5 wherein the field effect transistor also functions as a gain controlled radio frequency amplifier for the AM radio section.

* * * * *